(12) United States Patent
Mall et al.

(10) Patent No.: US 7,716,159 B2
(45) Date of Patent: May 11, 2010

(54) ADAPTIVE SALES ASSISTANT

(75) Inventors: Sanjeet Mall, Heidelberg (DE); Hilmar Dolderer, Stuttgart (DE)

(73) Assignee: SAP AG, Walldorf (DE)

( * ) Notice: Subject to any disclaimer, the term of this patent is extended or adjusted under 35 U.S.C. 154(b) by 137 days.

(21) Appl. No.: 11/640,721

(22) Filed: Dec. 18, 2006

(65) Prior Publication Data

US 2008/0147478 A1 Jun. 19, 2008

(51) Int. Cl.
*G06F 17/30* (2006.01)
(52) U.S. Cl. .......................................... 707/3; 707/10
(58) Field of Classification Search ...................... None
See application file for complete search history.

(56) References Cited

U.S. PATENT DOCUMENTS 5,890,149 A * 3/1999 Schmonsees ................... 707/3
7,216,087 B2 * 5/2007 Thompson et al. ............ 705/10
2002/0143652 A1 * 10/2002 Beckett ........................ 705/26

* cited by examiner

*Primary Examiner*—Baoquoc N To
(74) *Attorney, Agent, or Firm*—Brake Hughes Bellermann LLP

(57) ABSTRACT

A computer-implemented method includes providing one or more initial questions, including a first question, selected from a database of possible questions, where the one or more provided questions are selected based on a sales phase of a sales opportunity. A first response to the first question is received, and one or more additional questions are provided, where each additional question is based at least in part on the first response to the first question. Additional responses to the additional questions are received, and a sales strategy associated with the sales phase of the sales opportunity is provided, where the sales strategy is based at least in part on the first response and the one or more additional responses and the sales strategy includes one or more actions to perform. The one or more included actions are selected from a database of possible actions based on their anticipated ability to increase a likelihood of success of the sales opportunity.

20 Claims, 4 Drawing Sheets

ADAPTIVE SALES ASSISTANT

TECHNICAL FIELD

This description relates to an adaptive sales assistant.

BACKGROUND

Sales are an integral part of operating practically any business, and as such, great importance may be laid upon the sales processes used to identify the sales opportunities, monitor and manage the opportunities, and convert the opportunities into actual sales. Small-scale sales opportunities may be identified, monitored, managed, and converted by one or two people and the entire lifespan of the opportunity may last on a short period of time. However, larger-scale sales opportunities may require large teams of sales people working across multiple sales phases, each of which may span months or even years. It is likely that during the course of such large-scale sales opportunities, the procuring business will lose multiple sales persons involved in the procurement process, well before the opportunity may be won. As such, unless the procuring business has a defined sales strategy in place, often times when employees leave a business, so too leaves their knowledge of the business's sales processes.

Businesses seek ways to formalize their sales processes and decouple the sales knowledge from their employees and transfer it into systems that may be implemented and that remain viable even in the face of employee turnover. Additionally, businesses seek ways to quickly and efficiently determine which sales strategy to use for their current sales situation, without having to spend time answering irrelevant questions.

There may exist best practice sales approaches, especially in the case of large-scale sales opportunities, however with a people-centric system it may be difficult to determine where in the sales lifecycle the company currently operates and what is the best practice or action needed to take to help win the procurement.

SUMMARY

In a first general aspect, a computer-implemented method includes providing one or more initial questions, including a first question, selected from a database of possible questions, where the one or more provided questions are selected based on a sales phase of a sales opportunity. A first response to the first question is received, and one or more additional questions are provided, where each additional question is based at least in part on the first response to the first question. Additional responses to the additional questions are received, and a sales strategy associated with the sales phase of the sales opportunity is provided, where the sales strategy is based at least in part on the first response and the one or more additional responses and the sales strategy includes one or more actions to perform. The one or more included actions are selected from a database of possible actions based on their anticipated ability to increase a likelihood of success of the sales opportunity.

In another general aspect, a system includes a processor, a memory device, a user interface, and a sales strategy engine. The processor is configured to determine, based on an input from a user, a first sales phase of a sales opportunity, where the sales opportunity includes a plurality of sales phases. The memory device is configured to store a plurality of questions associated with the first sales phase. The user interface is configured to provide a questionnaire, based on the plurality of questions, to the user and receive a plurality of responses from the user associated with the plurality of questions, where a response to a first question determines a second question to be provided. The sales strategy engine is configured to provide one or more actions to perform based on the plurality of responses, where the one or more actions are associated with the first sales phase of the sales opportunity and are configured to increase a likelihood of success of the sales opportunity.

The details of one or more implementations are set forth in the accompanying drawings and the description below. Other features will be apparent from the description and drawings, and from the claims.

DETAILED DESCRIPTION

Figure 1:
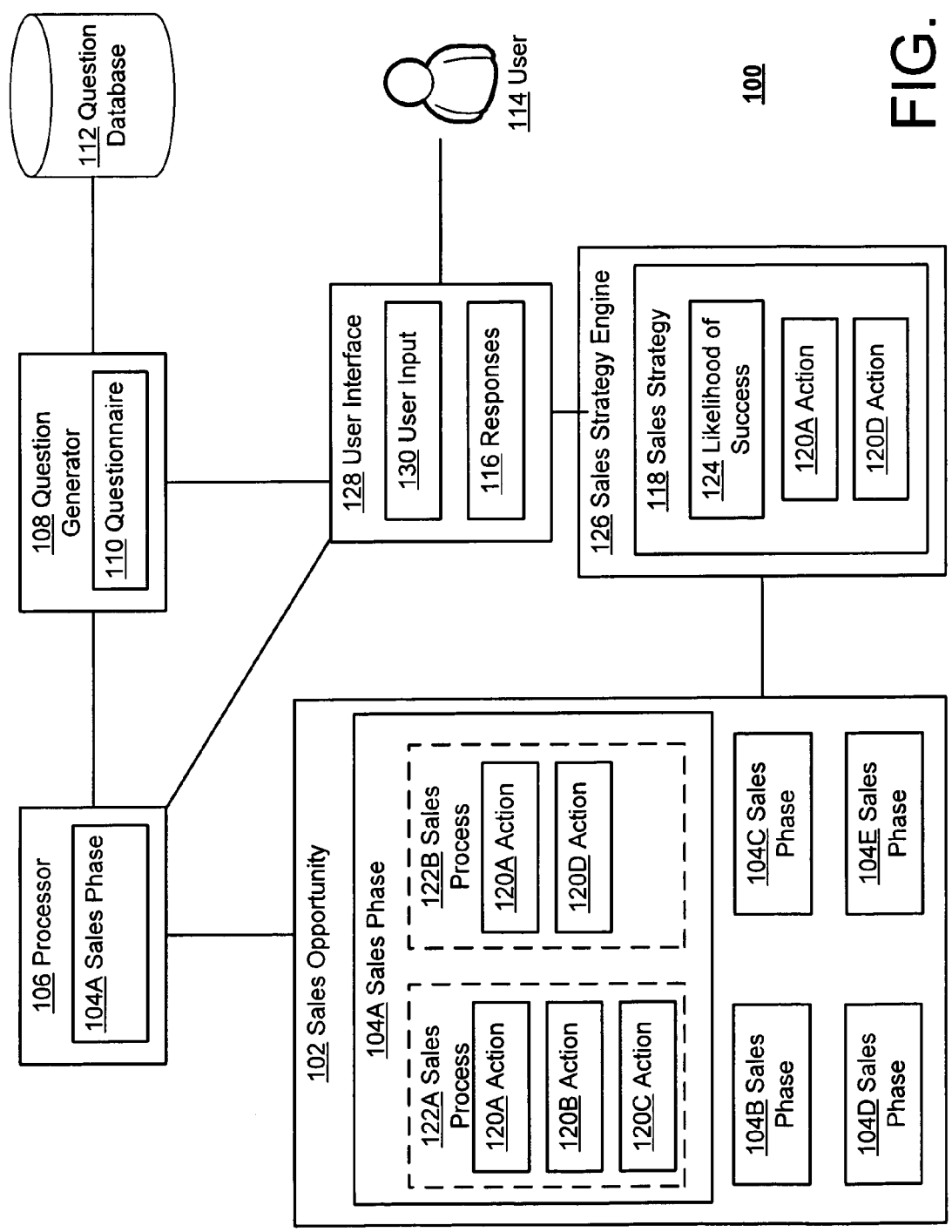
FIG. 1 is a block diagram of an example system for a file content preview tool, according to an example embodiment.

FIG. 1 is a block diagram of an example system 100 for an adaptive sales assistant, according to an example embodiment. In the example of FIG. 1, the system 100 may receive information about a company's sales processes, including processes associated with one or more particular sales opportunities, and provide a sales strategy with action items anticipated to improve the company's sales processes and/or increase the chances of the company procuring or winning the sales opportunities. As such, the system 100 may allow a company to replace a people-centric sales process with a structured or formalized sales strategy that may continue to be viable even in the case of company employee turnover or the realities of poor communication between employees.

According to an example embodiment, the employees of the company may provide information to the system 100 concerning a large-scale sales opportunity 102 with sales phases 104A, 104B, 104C, 104D, and 104E. The sales opportunity 102 and the sales phases 104A, 104B, 104C, 104D, and 104E can span months or even years. Based on the information provided by the employees, the system 100 may provide to the employees a questionnaire configured to elicit additional information about the opportunity, including the current sales phase. The questionnaire may be cumulative in nature, wherein a latter question may be determined by a response to a prior question, thus making all the questions presented relevant to the employees, which may save the employees both the time and frustration involved in answering irrelevant or inapplicable questions. Based on the employees' responses, the system 100 may then, for example, provide a sales strategy designed to increase the company's chances of procuring or winning the sales opportunity.

The sales opportunity 102 may include a business process, such as a potential or actual sale or lease of any product, service, and/or equipment. For example, the sales opportunity 102 may be a large-scale sales project, involving one or more teams of sales people. For example, the sales opportunity 102 may be for the installation of computer infrastructure for a new airport facility. The installation may require, for example, installing and configuring hundreds of specialized computer terminals, and laying thousands of yards of network cable over the course of several years. The sales opportunity 102 may span months or years, and include multiple sales phases 104A, 104B, 104C, 104D, and 104E.

The sales phases 104A, 104B, 104C, 104D, and 104E may include a phase or stage of a sales project, spanning over a period of time. For example, the sales phases 104A, 104B, 104C, 104D, and 104E may include, but are not limited to, an information gathering phase, an initial proposal phase, a detailed proposal phase including an estimated timetable for the project that would result from the opportunity, a price negotiation phase, a contract writing phase, a project implementation phase, and a project oversight phase. The sales phases 104A, 104B, 104C, 104D, and 104E may include phases of a sales lifecycle of the sales opportunity 102. The sales phases 104A, 104B, 104C, 104D, and 104E may run concurrently and/or sequentially. For example, after the completion of the sales phase 104A, the sales phase 104B may begin. Then, for example, prior to the completion of the sales phase 104B, the sales phase 104C may begin, such that the sales phases 104B and 104C overlap for a period of time.

For example, in the airport construction example above, the sales phase 104A may be gathering information useful in preparing a bid, the sales phase 104B may be the submission of a sales proposal, and the sales phase 104C may be finalization of terms and signing of a contract. Thus, after information has been gathered in sales phase 104A, the sales phase 104B may begin and the sales proposal be drawn up and submitted. Then, for example, as the sales proposal is drawn up during the sales phase 104B, there may be back and forth interaction with the customer to finalize terms of the sales proposal, thus being applicable more to the sales phase 104C, which may include finalizing terms and signing a contract.

In another example embodiment, a sales phase 104B may occur multiple discrete times during the course of the sales lifecycle of the sales opportunity 102. Continuing the airport example above, for example, a first sales proposal may be submitted for the laying of the network cables during a sales phase 104B, and a contract for the laying of the network cables may be signed during another sales phase 104C. Then, for example, a second sales proposal may be submitted for the installation and configuration of the computer terminals during a second sales phase 104D, and a contract for the installation and configuration of the computer terminals may be signed during a second sales phase 104E.

A processor 106 running a sales phase detection module may determine the current sales phase(s) 104A, 104B, 104C, 104D, or 104E of interest of the opportunity 102. The processor 106 may determine, based on previously received information that the sales opportunity 102 is currently in the sales phase 104A. For example, the system 100 may have received preliminary information about events that are expected to occur or data that is expected to be input to the system 100 during particular sales phases 104A, 104B, 104C, 104D, and 104E, and based on the detection of such preliminary information, the processor 106 may determine the sales phase 104A of the sales opportunity 102 is currently occurring. In another example embodiment, a user may input information designating a sales phase of particular importance or indicating which phase is the current phase.

In another example embodiment, the processor 106 may detect a change in the sales opportunity 102 and determine the current sales phase. For example, the system 100 may have access to a database or other storage where sales documents associated with the sales opportunity 102 may be stored. Then for example, the system 100 may monitor the documents being uploaded, downloaded and/or modified on the database, and based on the changes to the documents, the processor 106 may determine a shift from the sales phase 104A to the sales phase 104B. For example, if the sales phase 104A is information gathering, then for example, the processor 106 may detect that a preliminary proposal outline document was created, thus indicating a shift from the information gathering of sales phase 104A to the sales proposal drafting and submission of the sales phase 104B.

Questions may be selected or determined by a question generator 108. The question generator 108 may determine, based on the sales phase 104A (as determined by the processor 106) and/or the sales opportunity 102, a question or set of questions to provide to a user. The questions may be configured to elicit information about the sales phases 104A, 104B, 104C, 104D, and 104E and/or the sales opportunity 102. The questions may also be based on other external factors, such as, for example, the business environment associated with the sales opportunity 102 and/or the identity of competitors that might compete in the marketplace for the sales opportunity 102. According to another example embodiment, the question generator 108 may provide questions configured to elicit information to be used by the processor 106 in determining which sales phase 104A, 104B, 104C, 104D, or 104E is current.

The questions may be provided in the form of a questionnaire 110. The questionnaire 110 may be a set of cumulative questions, provided to a user or group of users, determined to elicit information from the user(s), wherein the answer to a first question of the questionnaire 110 may be used to determine a second question. According to an example embodiment, the questionnaire 110 may be configured to elicit information from a group of users of a company concerning sales processes of the company that is competing for the sales opportunity 102. The elicited information, then may be used to provide a more structured sales methodology, including action items, that has been decoupled from specific sales persons in the company, thus reducing the impact of any employee turnover within the company on the sales strategy, and generating a relatively coordinated and predictable approach to the sales strategy as compared to a "people-centric" approach. The questionnaire 110 is discussed in greater detail below in association with FIG. 2.

The question generator 108 may generate or determine the questions of the questionnaire 110 based at least in part on a question database 112. The question database 112 may include a database or other collection of questions or other information associated with the sales phase 104A and/or the sales opportunity 102. For example, the question generator 108 may select predetermined questions from the question database 112 to provide to a user 114 via the questionnaire. According to an example embodiment, after a first answer is received in response to a first question of the questionnaire 110, the question generator 108 may determine a second question, associated with the first response, from the question database 112.

The user 114 may include a company, an organization, a single person, or multiple people associated with a sales process associated with the sales opportunity 102. For example, the user 114 may be a salesperson, who may be part of a larger team of salespersons, who may be part of a company trying to procure or win the sales opportunity 102. The user 114 may provide information that may be used by the processor 106 to determine the sales phase 104A, and may also respond to questions in the questionnaire 110. For example, the questionnaire 110 may provide a set of questions to the user 114 who may then provide responses 116 to the questions.

The responses 116 may include answers to questions as provided by a user or group of users. For example, the responses 116 may include answers to the questions of the questionnaire 110 as provided by the user 114. Each response of the responses 116 may be used by the questionnaire 110 and/or the question generator 108 to determine a subsequent question. For example, a first question may ask the user 114 "Do you know the monetary value of the opportunity?," and then if the responses 116 includes "yes" the second question posed to the user 114 may be "What is the total monetary size of the opportunity?" In another example embodiment, the responses 116 may include "no" as the answer to the first question, then for example the second question may be "How many employees does the customer have?" The responses 116 may include check-box, multiple-choice, fill in the blank, and/or other types of responses or answers.

In another example embodiment, the question database 112 may store information associated with prior sales processes of the user 114, including previous questionnaires 110 and responses 116. Then, for example, in providing a current questionnaire 110 to the user 114, the question generator 108 may utilize the previously stored information, thus allowing for an optimization of the sales processes.

In an example embodiment, a first questionnaire 110 associated with the sales opportunity 102 may be provided to the user 114. The user may then provide the responses 116 to the first questionnaire 110, which the processor 106 may then use to determine that the sales phase 104A is the current sales phase of the sales opportunity 102. Then, for example, the question generator 108 may retrieve questions from the question database 112 to generate a second questionnaire 110 associated with the sales phase 104A. The user 114 then may provide the responses 116 to the second questionnaire 110 and the responses 116 to the second questionnaire 110 may be used by a sales strategy engine 126 to determine a sales strategy 118 associated with the sales phase 104A and/or the sales opportunity 102.

The sales strategy 118 may include a best known practice or best available approach for increasing a likelihood of winning or procuring the sales opportunity 102 in the current sales phase 104A. The sales strategy 118 may be based, at least in part, on the responses 116. For example, the responses 116 may be used to determine an existing state of the sales phase 104A and/or the sales opportunity 102. Then, for example, based on the responses 116, the sales strategy 118 may include one or more predetermined actions 120A, 120B, 120C, and/or 120D that are anticipated to increase a likelihood of winning the sales opportunity 102 if performed. For example, the action 120A may be "call the customer CEO to discuss the opportunity"; and the action 120B may be "call the customer opportunity-manager to inquire when the sales proposal must be submitted." The actions 120A, 120B, 120C, and 120D may be performed sequentially and/or concurrently by one or more users 114. The actions 120A, 120B, 120C, and 120D may be associated with one or more sales processes 122A and 122B.

The sales processes 122A and 122B may include one or more best practices or approaches to increase a chance of winning an opportunity in a sales phase. For example, the sales process 122A may include a best known practice for winning the sales opportunity 102 in the sales phase 104A. Then, for example, the sales process 122B may include an alternative or supplementary best known practice for winning the opportunity 122 in the sales phase 104A. The sales processes 122A and 122B may be based on past experiences of the company trying to win the sales opportunity 102, empirical evidence, case studies, industry data, and/or any other information relevant to sales and/or the sales opportunity 102. For example, the sales process 122A may be based on a strategy geared towards knowing and beating competitors for the sales opportunity 102, while the sales process 122B may be a strategy based on knowing as much as possible about the customer and the sales opportunity 102. The sales process 122A may include one or more actions 120A, 120B, 120C, and 120D to perform to increase the chance of winning the opportunity.

As explained above, based on the responses 116 to the questionnaire 110, the sales strategy 118 may include one or more actions associated with one or more sales process of one or more sales phases of an opportunity. For example, if the responses 116 are determined to be associated with the sales process 122B, then the sales strategy 118 may include the actions 120A and 120D. In another example embodiment, the responses 116 may be determined to be associated with more than one sales process 122A and 122B and thus the sales strategy 118 may include actions 120A, 120B, 120C, and 120D associated with the multiple sales processes 122A and 122B. In another example embodiment, based on the responses 116, it may be determined that the user 114 has already performed the actions 120A and B, and then the sales strategy 118 may include the remaining action 120C associated with the sales process 122A.

The sales strategy engine 126 also may calculate a likelihood of success 124 of the proposed sales strategy 118. The likelihood of success 124 may include a percentage, chance, or other probability measure that a user 114 will win the sales opportunity 102. To determine the likelihood of success 124, the responses 116 and/or the questions of the questionnaire 110 may be attributed weights corresponding to whether based on the responses 116, the user 114 has a better, worse, or unchanged likelihood of winning the sales opportunity 102 and the engine 126 may process the user's answers to the questions to determine the likelihood of success 124. For example, a user response that he plays golf with the customer may increase the likelihood of success 124 more than a user response that he plays soccer with the customer.

The likelihood of success 124 may be based, at least in part, on information provided about the business environment of the sales opportunity, including the identity of competitors for the sales opportunity 102. The likelihood of success 124 may include a comparison of the likelihood of success prior to performing the suggested actions 120A and 120D of the sales strategy 118 and an anticipated likelihood of success that would exist after successful performance of the suggested actions 120A and 120D. For example, a user response that he performed the action 120A which stated "call the customer CEO to inquire about the opportunity" may increase the likelihood of success 124. In another example embodiment, the likelihood of success 124 may be continually updated as the actions 120A and 120D are performed and/or as other changes in the business environment associated with the opportunity 102 occur.

According to an example embodiment, the user 114 may respond to the questionnaire 110 via a user interface 128. The user interface 128 may include a graphical and/or textual user interface provided to the user 114 via any computer device, such as a computer, laptop, mobile phone, personal digital assistant (PDA), etc. The user interface 128 may, for example, provide the questionnaire 110 to the user 114 and receive the responses 116. The user interface 128 may also receive other user input 130 in addition to the responses 116.

The user input 130 may include any input from a user. For example, the user input 130 may include information to be used by the processor 106 to determine the sales phase 104A. The user input 130 may include, for example, information about the sales opportunity 102, the sales phases 104A, and/or the user 114. The user input 130 may include, for example, an indication that there has been a shift in the sales opportunity 102 from the sales phase 104A to the sales phase 104B. For example, as discussed above, a new document, such as a preliminary proposal document, may be uploaded to a database wherein the processor 106 may detect the new document and infer a shift from the sales phase 104A to 104B. In another example embodiment, the user 114 may complete the action 120A and may document such completion with the system 100 via the user input 130.

The user input 130 may also be used by the user 114 to provide information about a change in the business environment associated with the sales opportunity 102. For example, in continuing the installation of computer infrastructure example above, a change in the business environment may include, but not be limited to, a change in the costs of materials, such as the cable, a new competitor, a competitor who withdraws from bidding for the sales opportunity 102, or a change in management of the customer.

According to an example embodiment, the system 100 may monitor the user's 114 progress towards winning the sales opportunity 102. For example, the processor 106 may determine, based on the user input 130, as discussed above, that the sales opportunity 102 has shifted from the sales phase 104A to the sales phase 104B. Then, for example, based on the new sales phase of interest, e.g., sales phase 104B, the question generator 108 may provide a questionnaire 110 associated with the sales phase 104B, wherein the sales strategy engine 126 may then provide the sales strategy 118 based on the responses 116.

Figure 2:
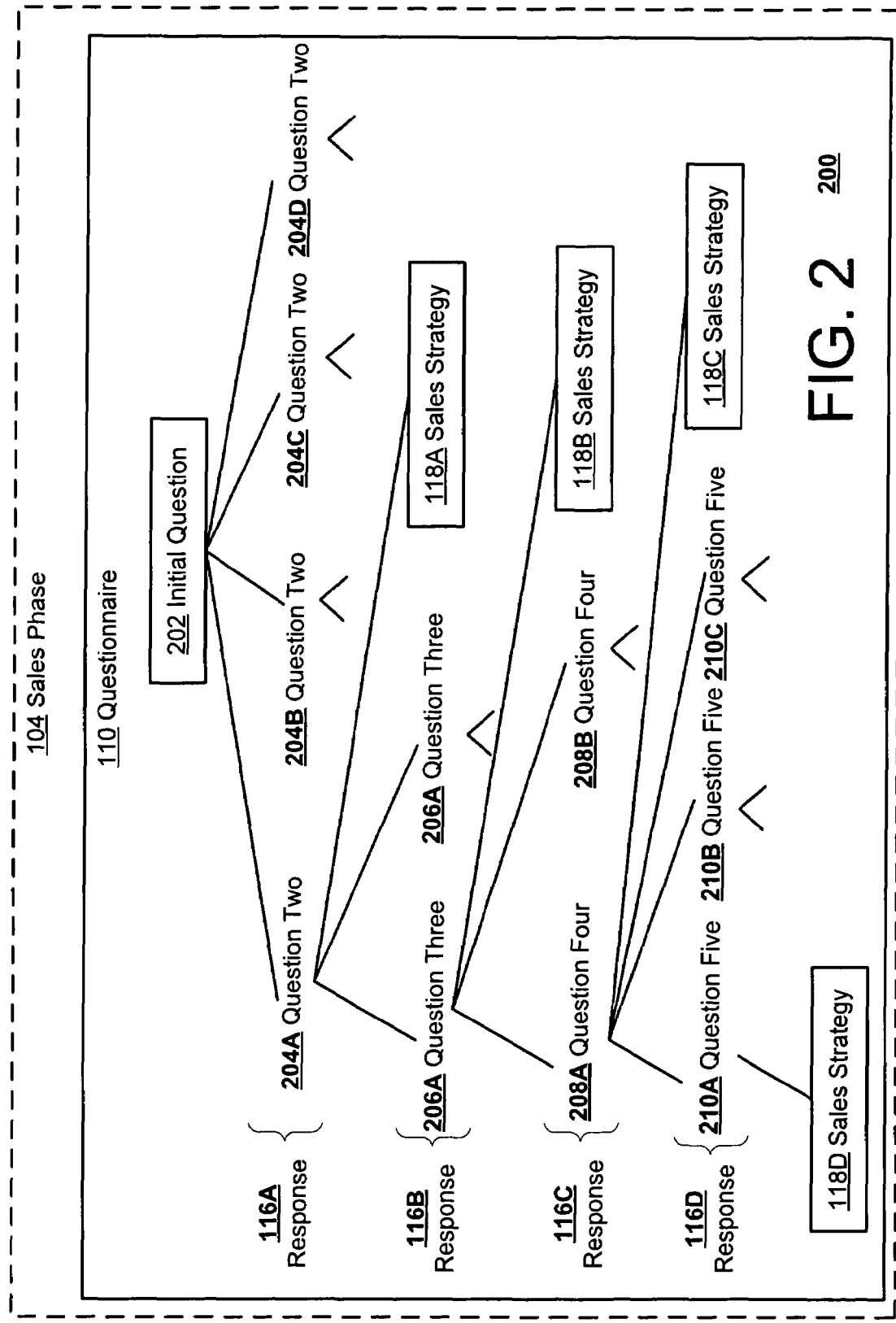
FIG. 2 is a flowchart illustrating example operations of the system of FIG. 1.

FIG. 2 is a block diagram of an example system 200 for providing the questionnaire 110 of FIG. 1, according to an example embodiment. In the example of FIG. 2, the system 200 may provide questions, wherein a succeeding question may be based at least in part on a preceding response. In the example of FIG. 2, the system 200 may include components that are similar or substantially similar to like numbered components of FIG. 1.

The questionnaire 110 may be associated with the sales phase 104 and may include an initial question 202. The initial question 202 may include a predetermined question (i.e. not based on a prior response) that is associated with the sales phase 104 and/or a sales opportunity or project. For example, the sales phase 104 may be "submit detailed proposal," and the initial question 202 may be "how long ago was the initial proposal submitted?" The questionnaire 110 may then receive the response 116A to the initial question 202.

Then, for example, based on the response 116A, the questionnaire 110 may provide a second question 204A, 204B, 204C, or 204D. For example, the second question 204A, 204B, 204C, or 204D may be a question or query associated with the sales phase 104 and based at least in part on one or more previous answers. For example, the second question 204A, 204B, 204C, or 204D may be determined based on the response 116A. Continuing the example above, if the initial question is "how long ago was the initial proposal submitted?," then, for example, the second question 204A may be provided if the response 116A is "0-3 months," the second question 204B may be provided if the response 116A is "3-6 months," the second question 204C may be provided if the response 116A is "6-12 months," and the second question 204D may be provided if the response 116A is "12+ months." Thus, if the response 116A is "2 months," the second question 204A may be provided.

Then, for example, the response 116B may be provided as the answer to the second question 204A. Based on the response 1166B, the questionnaire 110 may provide the third question 206A, the third question 206B, or the sales strategy 118A. For example, the responses 116A and/or 116B may be such that based on those two responses, the sales strategy 118A may be determined and provided. Otherwise for example, the questionnaire 110 may need additional information to provide a sales strategy, and as such may provide the third question 206A or 206B, as determined based at least in part on the response 1116B.

According to an example embodiment, the third question 206A may be provided based on the response 116B, thus providing an option for providing the fourth question 208A or 208B or the sales strategy 1188B. However, in another example embodiment, the third question 206B may be provided, in which case a different set of fourth questions 208A, 208B, 208C, or 208D may be provided, including additional, fewer, and/or different questions and sales strategies.

The same or similar process as just described in reference to response 116B, the third questions 206A and 206B and the sales strategy 118A, may be repeated in reference to the response 116C, the fourth questions 208A and 208B, and the sales strategy 118B, and the response 116D. That is a fifth question 210A, 2101B, or 210C, and the sales strategy 118C can be provided in response to the response 116D. Then, for example, if the fifth question 210A is provided, regardless of what response is given in response to the fifth question 210A, the sales strategy 118D may be provided.

Figure 3:
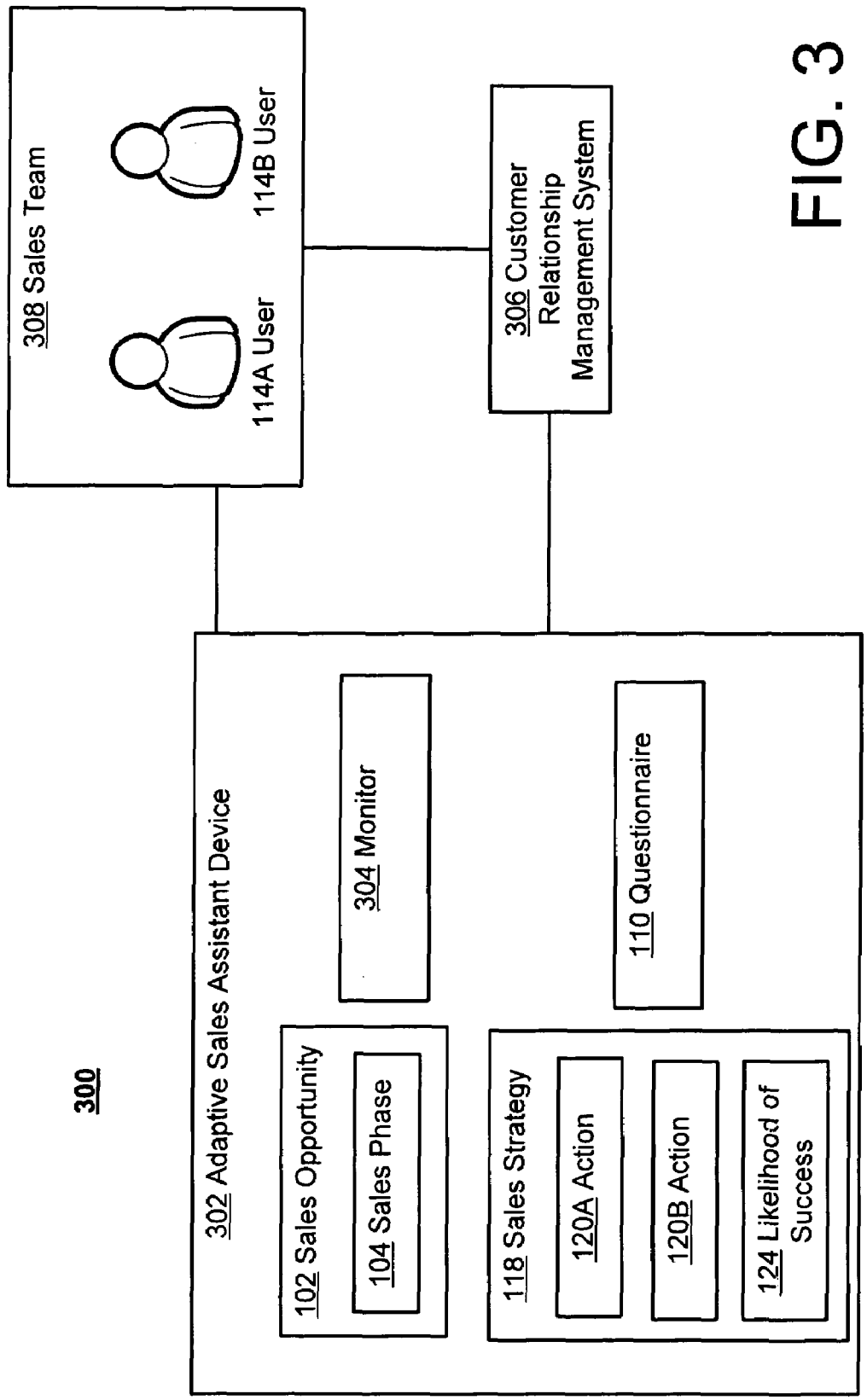
FIG. 3 is a block diagram of an example system for a file content preview tool, according to another example embodiment.

FIG. 3 is a block diagram of an example system 300 for an adaptive sales assistant, according to an example embodiment. In the example of FIG. 3, the system 300 may include components that are similar or substantially similar to like numbered components of FIG. 1 and/or FIG. 2. In the example of FIG. 3, the system 300 may include an adaptive sales assistant device 302 that may monitor a sales phase of a sales opportunity to determine when changes have occurred to either the sales phase or the opportunity, receive information about the changes and provide a sales strategy associated with the changes.

A monitor 304 may monitor for changes to the sales opportunity 102 and/or the sales phase 104. For example, the monitor 304 may monitor for any user input that may signal a change in the sales opportunity 102, including the business environment. In another example embodiment, the monitor 304 may track the actions 120A and 120B to determine if and/or when the actions 120A and 120B are performed.

According to an example embodiment, the monitor 304 may determine a change by monitoring a customer relationship management system 306. The customer relationship management system 306 may include documents and files associated with customer relationship management. For example, the customer relationship management system 306 may include a database or other storage unit configured to store and/or access documents associated with the sales opportunity 102 and/or the sales phase 104. For example, the customer relationship management system 306 may include documents gathered during the "information gathering stage" and initial proposal documents submitted during the sales phase 104 of the opportunity 102. Then, for example, when a document is added, removed, or updated by a user 114A or 114B, the monitor 304 may detect the change and determine whether the sales opportunity 102 and/or the sales phase 104 has changed. For example, a document titled "initial proposal outline" may be created in the customer relationship management system 306. Based on the new document, then for example, the monitor 304 may determine a shift from the "information gathering" phase to the "initial proposal drafting and submittal" phase. If a change is detected a new questionnaire 110 associated with the change may be provided to one or more members of the sales team 308.

The sales team 308 may include multiple users 114A and 114B associated with the sales opportunity 102. The sales team 308 may include a group of users 114A and 114B who are involved in procuring or winning the sales opportunity 102. For example the users 114A and 114B may be sales associates working for a company trying to win the sales opportunity 102. The one or more users 114A and 114B of the sales team 308 may update the customer relationship management system 306 by, for example, creating, removing and/or otherwise modifying customer relationship documents stored in the customer relationship management system 306.

Then, for example, the monitor 304 may detect the update to the customer relationship management system 306 and determine there has been a change in the sales opportunity 102. The adaptive sales assistant device 302 may then provide the questionnaire 110 to the sales team 308. In an example embodiment, each member of the sales team 308, i.e. the users 114A and 114B, may be provided a questionnaire 110. Each member of the sales team 308 may receive a different questionnaire 110 that may vary depending on the user's 114A 114B position in the sales team 308. For example, the user 114A may be a manager who may receive a first questionnaire 110, and the user 114B may be an associate who may receive a second questionnaire 110.

The adaptive sales assistant device 302 may then provide the sales strategy 118 to the sales team 308. According to an example embodiment, the sales strategy 118 may apply to either a single user 114A or B and/or to the sales team 308. For example, the actions 120A and 120B may both apply to a single user 114A or B, or may be applied to and divided among the whole sales team 308.

The likelihood of success 124 also may be applied to the users 114A or 114B individually or to the sales team 308. For example, the likelihood of success 124 may be determined if no actions are performed, if only actions are performed by the user 114A or 114B, and/or if the actions are performed by the sales team 308, including the users 114A and 114B.

Figure 4:
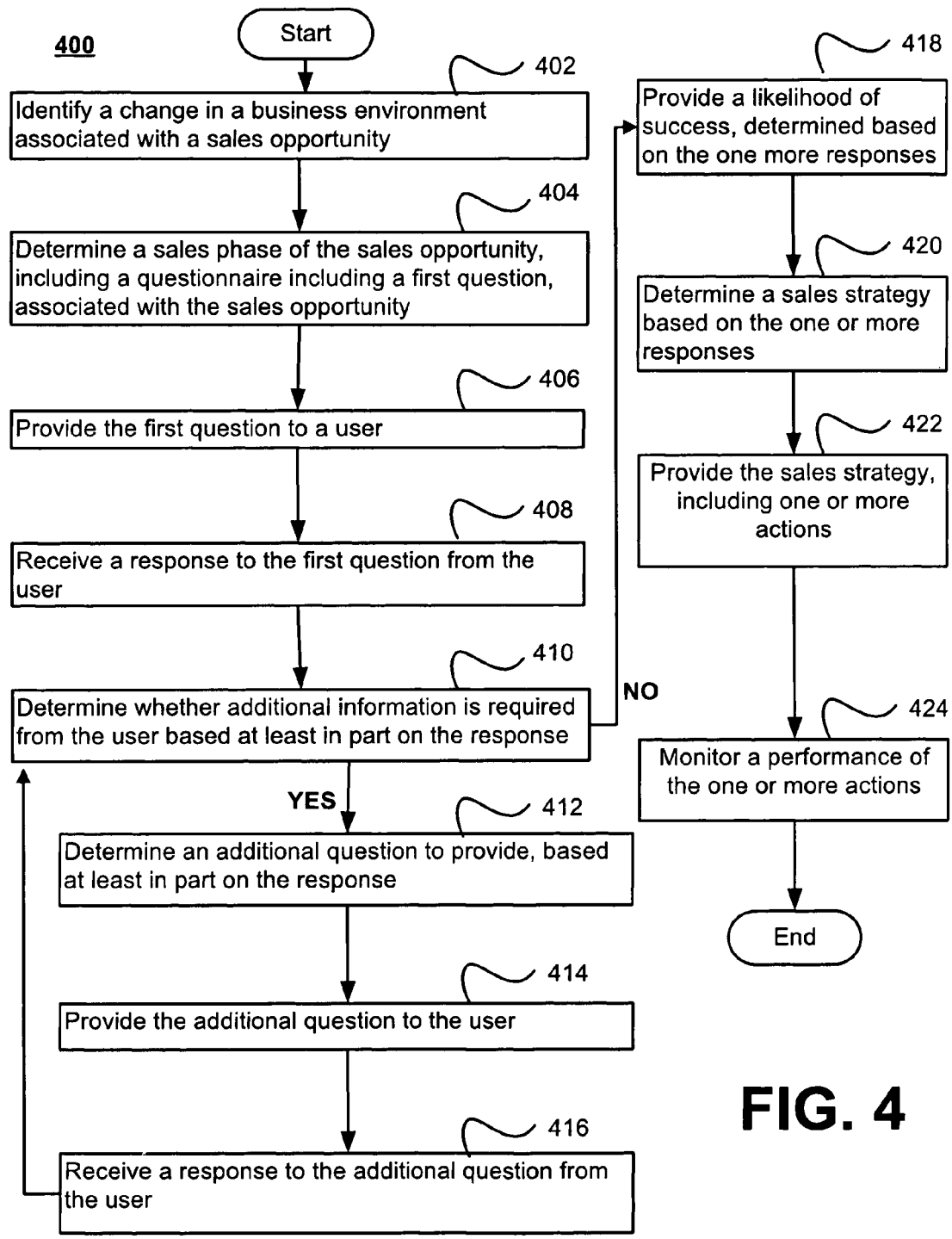
FIG. 4 is a block diagram of an example system for a file content preview tool, according to another example embodiment.

FIG. 4 is a flowchart 400 illustrating example operations of the systems of FIG. 1, FIG. 2, and FIG. 3. More specifically, FIG. 4 illustrates an operational flow 400 representing example operations related to providing an adaptive sales assistant.

After a start operation, a change in a business environment may be identified, wherein the change may be associated with a sales opportunity (402). For example, as shown in FIG. 1, a user input 130 may identify a change in a business environment associated with the sales opportunity 102. For example, the user 114 may provide information regarding the beginning of a new sales opportunity 102. In another example embodiment, the monitor 304 may detect an update associated with the customer relationship management system 306 indicating a change in the business environment associated with the sales opportunity 102.

A sales phase of the sales opportunity may be determined, including a questionnaire including a first question associated with the sales opportunity (404). For example, the processor 106 may determine the sales phase 104A of the sales opportunity 102. Then, for example, as shown in FIG. 2, the questionnaire 110 may include the initial question 202 associated with the sales phase 104 of the sales opportunity 102.

Then the first question may be provided to a user (406). For example, the initial question 202 of the questionnaire 110 may be provided to the user 114 via the user interface 128.

Then a response to the first question may be received from the user (408). For example, the user may provide the responses 116 to the questionnaire 110, including the response 116A to the initial question 202.

Then it may be determined whether additional information is required from the user based at least in part on the response (410). For example, based on the response 116A, the questionnaire 110 may determine whether a sales strategy exists for the response 116A. In the example of FIG. 2, no sales strategy exists and thus a second question 204A, 204B, 204C, or 204D may be provided.

If additional information is required, then an additional question to provide may be determined, wherein the additional question may be based at least in part on the response (412). For example, the second question 204A may be determined to correspond to the response 116A.

Then the additional question may be provided to the user (414). For example, the second question 204A, as determined to correspond to the response 116A, may be provided to the user 114.

Then a response to the additional question may be received from the user (416). For example, the response 116B may be received from the user 114.

When additional information is no longer required to determine a sales strategy, a likelihood of success may be provided, wherein the likelihood of success may be determined based on the one or more responses (418). For example, once a sales strategy 118A, 118B, 118C, or 118D is reached, no additional information may be required. Then, for example, the responses 116A, 116B, 116C, or -116D (as applicable) may be provided to the sales strategy engine 126 to determine the likelihood of success 124.

A sales strategy may be determined based on the one or more responses (420). For example, once the response 116A, 116B, 116C, or 116D is determined to correspond to the sales strategy 118A, 118B, 118C, or 118D, the sales strategy engine 126 may determine the sales strategy 118.

Then the sales strategy, including one or more actions, may be provided (422). For example, the sales strategy 118, including the actions 120A and 120D may be provided.

The performance of the one or more actions may be monitored (424). For example, the monitor 304 may monitor the performance the actions 120A and 120B, as provided by the sales strategy 118.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A computer-implemented method comprising:
providing one or more initial questions, including a first question, selected from a database of possible questions;
receiving a first response to the first question;
determining, via a processor, a sales phase of a sales opportunity, wherein the sales opportunity includes a plurality of sales phases;
providing one or more additional questions, wherein each additional question is based at least in part on the first response to the first question and wherein the one or more additional questions is selected based on the determined sales phase of the sales opportunity;
receiving additional responses to the additional questions;
calculating a quantitative value for a likelihood of success in the sales opportunity based on the first response and the additional responses;
determining a sales strategy associated with the sales phase of the sales opportunity wherein the sales strategy is anticipated to increase the likelihood of success in the sales opportunity; and
providing the sales strategy including one or more actions to perform, wherein the one or more actions are selected from a database of possible actions based on their anticipated ability to increase the likelihood of success of the sales opportunity.

2. The method of claim 1 further comprising:
identifying a change in a business environment associated with the sales opportunity;
wherein the determination of the sales phase is based on the identified change in the business environment; and
wherein the selection of the one or more additional questions based on the identified change in the business environment.

3. The method of claim 1 wherein the providing one or more initial questions comprises:
determining the one or more initial questions based at least in part on a first sales process of the sales phase, wherein the sales phase includes one or more sales processes.

4. The method of claim 3 wherein the first sales process includes a combination and/or sequence of one or more actions anticipated to increase the likelihood of success of the sales opportunity.

5. The method of claim 1 wherein the determination of the sales phases is based at least in part on the received response to the first question.

6. The method of claim 1 wherein the provision of the one or more initial questions is based at least in part on the determination of the sales phase.

7. The method of claim 1 wherein the actions are selected to provide a best practice of one or more actions to take to win the sales opportunity.

8. The method of claim 1 wherein
at least one of receiving the first response and receiving the additional responses comprises receiving a qualitative response, and
wherein at least one of receiving the first response and receiving the additional responses comprises receiving a quantitative response.

9. The method of claim 1 further comprising:
providing a first questionnaire, including the first question and one or more additional questions to a first user;
receiving first responses to the first questionnaire from the first user;
providing a second questionnaire, including a second question and one or more additional questions to a second user;
receiving second responses to the second questionnaire from the second user; and
providing the sales strategy associated with the sales phase of the sales opportunity, based at least in part on the first responses and the second responses.

10. The method of claim 1 wherein the providing a sales strategy comprises:

determining a first likelihood of success associated with the sales opportunity, prior to a performance of at least one of the one or more actions; and determining a second likelihood of success associated with the sales opportunity based on a performance of the one or more of the one or more actions; and providing the sales strategy, including the first likelihood of success and the second likelihood of success.

11. A system comprising:

a processor configured to determine, based on an input from a user, a first sales phase of a sales opportunity, wherein the sales opportunity comprises a plurality of sales phases;

a memory device configured to store a plurality of questions associated with the first sales phase;

a user interface configured to provide a questionnaire, based on the plurality of questions, to the user and to receive a plurality of responses from the user associated with the plurality of questions, wherein a response to a first question determines a second question to be provided; and a sales strategy engine configured to calculate a qualitative value for a likelihood of success of the sales opportunity and provide one or more actions to perform based on the plurality of responses, wherein the one or more actions are associated with the first sales phase of the sales opportunity and are configured to increase the likelihood of success.

12. The system of claim 11 wherein the processor is further configured to determine a change in a business environment associated with the sales opportunity.

13. The system of claim 11 wherein the memory device is configured to store a plurality of questions associated with one or more of questionnaires associated with the first sales phase.

14. The system of claim 11 wherein the user interface is configured to provide the questionnaire to a plurality of users and receive a plurality of responses to the plurality of questions from the users, wherein one or more of the responses to a first question determine a second question to be provided.

15. The system of claim 11 wherein the sales strategy engine is further configured to monitor a performance of the one or more actions by the user.

16. The system of claim 11 wherein the sales strategy engine is configured to provide the one or more actions to a plurality of users to perform.

17. The system of claim 11 wherein the sales strategy engine is configured to assign a weight to the plurality of questions and the plurality of responses based at least in part on the first sales phase and/or the sales opportunity, wherein the strategy engine is configured to determine the one or more actions and/or the likelihood of success based at least in part on the weights.

18. A computer program product for determining a sales strategy, the computer program product being tangibly embodied in machine-readable storage device and including executable code that, when executed, is configured to cause a data processing apparatus to:

perform the following, with respect to a plurality of questions, wherein the plurality of questions are associated with a sales phase of a sales opportunity:

provide a first question selected from a database of possible questions;

receive a first response associated with the first question;

determine, via a processor, a sales phase of a sales opportunity, wherein the sales opportunity includes a plurality of sales phases; and provide a second question to provide based at least in part on the first response and based on the determined sales phase of the sales opportunity;

provide a quantitative value for a likelihood of success associated with the sales opportunity based at least in part on the plurality of questions and one or more responses associated with the plurality of questions; and provide a sales strategy configured to increase the likelihood of success.

19. The computer program product of claim 18 wherein the data processing apparatus configured to provide a likelihood of success is configured to:

make a comparison of the one or more responses to an ideal set of one or more responses; and provide the likelihood of success based at least in part on the comparison.

20. The computer program product of claim 18 wherein the data processing apparatus configured to provide a strategy is configured to:

make a comparison of the one or more responses to a proposed sales process, wherein the proposed sales process comprises a plurality of recommended actions; and provide one or more of the recommended actions based on the comparison.

* * * * *